(12) United States Patent
Seyve et al.

(10) Patent No.: US 12,041,383 B2
(45) Date of Patent: Jul. 16, 2024

(54) NON-LINEAR TIMELAPSE VIDEOS BASED ON MULTI-TEMPORAL SCALE DETECTION OF SCENE CONTENT CHANGE

(71) Applicant: Apple Inc., Cupertino, CA (US)

(72) Inventors: Christophe Seyve, Saratoga, CA (US); Xuemei Zhang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 118 days.

(21) Appl. No.: 17/934,849

(22) Filed: Sep. 23, 2022

(65) Prior Publication Data

US 2024/0106976 A1 Mar. 28, 2024

(51) Int. Cl.
*H04N 5/783* (2006.01)
*G06T 5/40* (2006.01)
*G06T 5/70* (2024.01)
*G06V 10/74* (2022.01)

(52) U.S. Cl.
CPC ............ *H04N 5/783* (2013.01); *G06T 5/40* (2013.01); *G06T 5/70* (2024.01); *G06V 10/761* (2022.01)

(58) Field of Classification Search
CPC ........ H04N 5/783; G06V 10/761; G06T 5/70; G06T 5/40
See application file for complete search history.

(56) References Cited

U.S. PATENT DOCUMENTS

| | | | |
|---|---|---|---|
| 10,327,046 B1 * | 6/2019 | Ni | H04N 21/8549 |
| 11,317,020 B1 * | 4/2022 | Krishnamurthy | H04R 1/08 |
| 2016/0094801 A1 * | 3/2016 | Beysserie | H04N 5/915 386/226 |
| 2018/0144476 A1 * | 5/2018 | Smith | G06T 7/174 |
| 2020/0327313 A1 * | 10/2020 | Kedarisetti | G06V 20/40 |

* cited by examiner

*Primary Examiner* — Thai Q Tran
*Assistant Examiner* — Jose M Mesa
(74) *Attorney, Agent, or Firm* — Blank Rome LLP

(57) ABSTRACT

Devices, methods, and non-transitory program storage devices are disclosed herein to perform intelligent determinations of non-linear (i.e., dynamic) image recording rates for the production of improved timelapse videos. The techniques described herein may be especially applicable to timelapse videos captured over long durations of time and/or with varying amounts of device motion/scene content change over the course of the captured video (e.g., when a user is walking, exercising, driving, etc. during the video's capture). By smoothly varying the image recording rate of the timelapse video in accordance with multi-temporal scale estimates of scene content change, the quality of the produced timelapse video may be improved (e.g., fewer long stretches of the video with too little action, as well as fewer stretches of the video where there is so much rapid action in the timelapse video that it is difficult for a viewer to perceive what is happening in the video).

20 Claims, 6 Drawing Sheets

NON-LINEAR TIMELAPSE VIDEOS BASED ON MULTI-TEMPORAL SCALE DETECTION OF SCENE CONTENT CHANGE

TECHNICAL FIELD

This disclosure relates generally to the field of image processing. More particularly, but not by way of limitation, it relates to techniques for producing timelapse videos with non-linear (i.e., dynamic) image frame recording rates using multi-temporal scale scene content change detectors.

BACKGROUND

The advent of portable integrated computing devices has caused a wide proliferation of cameras and video devices. These integrated computing devices commonly take the form of smartphones or tablets and typically include general purpose computers, cameras, sophisticated user interfaces including touch-sensitive screens, and wireless communications abilities, e.g., through Wi-Fi, Long Term Evolution (LTE), New Radio (NR), or other cellular-based or wireless technologies. The wide proliferation of these integrated devices provides opportunities to use these devices' capabilities to perform tasks that would otherwise require dedicated hardware and software. For example, integrated devices such as smartphones and tablets typically have two or more embedded cameras capable of capturing high quality video images. These cameras generally amount to lens/camera hardware modules that may be controlled through a general-purpose computer using firmware and/or other software (e.g., applications or "Apps") and a user interface including touchscreens, fixed buttons, and/or touchless controls, such as voice controls.

The integration of cameras into communication devices such as smartphones and tablets has also enabled people to share images and videos in ways never before possible. It is now very popular acquire and immediately share photos and videos with other people by sending the photos and videos via text message, SMS, email, or by uploading the photos and videos to an Internet-based website, such as a social networking site or a photo- or video-sharing website.

As mentioned above, immediately sharing videos recorded by integrated electronic devices is possible, however, bandwidth limitations and upload times may significantly constrain the length of videos that can easily be shared with third parties. In many instances, a short video clip that captures the essence of the entire action that has been recorded may be desirable. The duration of the video clip may depend on the subject matter of the video clip. For example, a several hours' long car ride or an evening at a party might be able to be reduced to a timelapse video clip lasting only a minute or two. Other types of actions, such as a sunset or the movement of clouds, might be better expressed in a clip of twenty to forty seconds.

While a timelapse video having a shortened duration may be desired, a user may often wish to capture the video over a much greater length of time, for example, over the duration of several minutes, hours, or even days, the user also may not know how long they will be capturing video for when the recording operation begins. As mentioned above, a user may desire to reduce the length of the video to provide a shortened, timelapse video that is of a shareable length—but still captures the essence of the underlying action in the captured video.

However, if a constant image frame recording rate (i.e., a recording frame rate that is agnostic to changes in the capturing device's position and/or changes in the underlying content being captured) is used over the duration of the video image stream that will be used to generate the timelapse video, then the timelapse video that is generated will likely be visually unpleasing, e.g., including long stretches in the generated timelapse video with little to no action that are boring to a viewer and/or stretches of the generated timelapse video where there is so much action in a short period of time that it is difficult for a viewer to perceive what is happening in that portion of the generated timelapse video.

Thus, there is a need for improved methods, apparatuses, computer readable media, and systems to intelligently determine non-linear (i.e., dynamic) image recording rates for the production of timelapse videos.

SUMMARY

Devices, methods, and non-transitory program storage devices are disclosed herein to perform intelligent determinations of non-linear (i.e., dynamic) image recording rates for the production of improved timelapse videos. The techniques described herein may be especially applicable to timelapse videos captured over long durations of time and/or with varying amounts of device motion/scene content change over the course of the captured video (e.g., in situations wherein a user is walking, exercising, driving, etc., as they are capturing the timelapse video). By smoothly varying the image recording rate of the timelapse video in accordance with multi-temporal scale estimates of scene content change, the quality of the produced timelapse video may be improved (e.g., fewer long stretches of the video with too little action, as well as fewer stretches of the video where there is so much rapid action in the timelapse video that it is difficult for a viewer to perceive what is happening in the video).

According to some embodiments, there is provided a device, comprising: a memory; one or more image capture devices; and one or more processors operatively coupled to the memory, wherein the one or more processors are configured to execute instructions causing the one or more processors to: obtain an incoming image stream comprising two or more first images captured by a first image capture device of the one or more image capture devices, wherein the incoming image stream is captured at a first image capture rate, and wherein the two or more first images are recorded to the memory at a first image recording rate; compute two or more image statistics for each of the two or more first images (e.g., image statistics, such as an image thumbnail; a luma histogram; a color histogram; a local histogram; a set of motion vectors; a depth map; a set of contrast statistics; or semantic content information, etc.), wherein each of the two or more image statistics are computed based, at least in part, on a comparison between a current or "reference" image of the two or more first images and a statistical model based on two or more non-reference images of the two or more first images; determine based, at least in part, on the computed two or more image statistics, a second image recording rate that is different than the first image recording rate; obtain one or more second images from the incoming image stream, wherein the one or more second images are recorded to the memory at the second image recording rate; and combine at least the two or more first images recorded to the memory and the one or more second images recorded to the memory to generate a timelapse video.

In some such embodiments, the device may further comprise: one or more sensors (e.g., a gyroscope, accelerometer, magnetometer, motion sensor, LiDAR sensor, and/or an Inertial Measurement Unit (IMU), etc.), wherein at least one of the two or more image statistics computed for each of the two or more first images is based, at least in part, on information obtained from the one or more sensors.

In other embodiments, the comparison that is made between a reference image of the two or more first images and a statistical model based on two or more non-reference images of the two or more first images that is performed as a part of the computation of each of the two or more image statistics comprises: performing a first comparison between the respective image statistic for the reference image and a statistical model, e.g., an average, a weighted average, an infinite impulse response (IIR) filter, an machine learning (ML) model, or other representation of the respective image statistics for a first subset of the two or more non-reference images. In some such embodiments, the comparison may further comprise performing a second comparison (e.g., at a different time scale than the first comparison) between the respective image statistic for the reference image and a statistical model based on the respective image statistics for a second subset of the two or more non-reference images, wherein the first subset and the second subset correspond to images captured over different lengths of time. In some such embodiments, the results of the first comparison and the results of the second comparison for each respective statistic may be blended to create a blended value for the respective statistic, e.g., wherein the second image recording rate may be further determined based, at least in part, on a blending of the respective blended values for each of the two or more statistics.

In still other embodiments, the device may be configured to perform "temporal filtering" on the change in the image recording rate, comprising obtaining one or more third images from the incoming image stream, wherein the one or more third images are recorded to the memory by the first image capture device at one or more image recording rates having recording rate values between the first image recording rate and the second image recording rate, wherein the one or more third images are captured subsequently to the one or more first images and prior to the one or more second images, and wherein the timelapse video is generated by combining the one or more third images recorded to the memory with the two or more first images recorded to the memory and the one or more second images recorded to the memory.

In some embodiments, the second image recording rate may be further configured to be a factor of the image capture rate of the first image capture device, or the image capture rate of the first image capture device may be set to be a multiple of the second image recording rate (i.e., to avoid judder effects in the resulting produced timelapse video). In still other embodiments, the second image recording rate may further be determined based, at least in part, on a desired amount of change per successive image in the generated timelapse video (e.g., a motion of 50, 100, or 200 pixels per recorded image frame, a threshold amount of change in a given statistic being present in 20% of an image's constituent tiles per recorded image frame, or the like).

Various non-transitory program storage device (NPSD) embodiments are also disclosed herein. Such NPSDs are readable by one or more processors. Instructions may be stored on the NPSDs for causing the one or more processors to perform any of the embodiments disclosed herein. Various image processing methods are also disclosed herein, in accordance with the device and NPSD embodiments disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Exemplary Timelapse Video Image Capture and Recording Timelines

Figure 1:
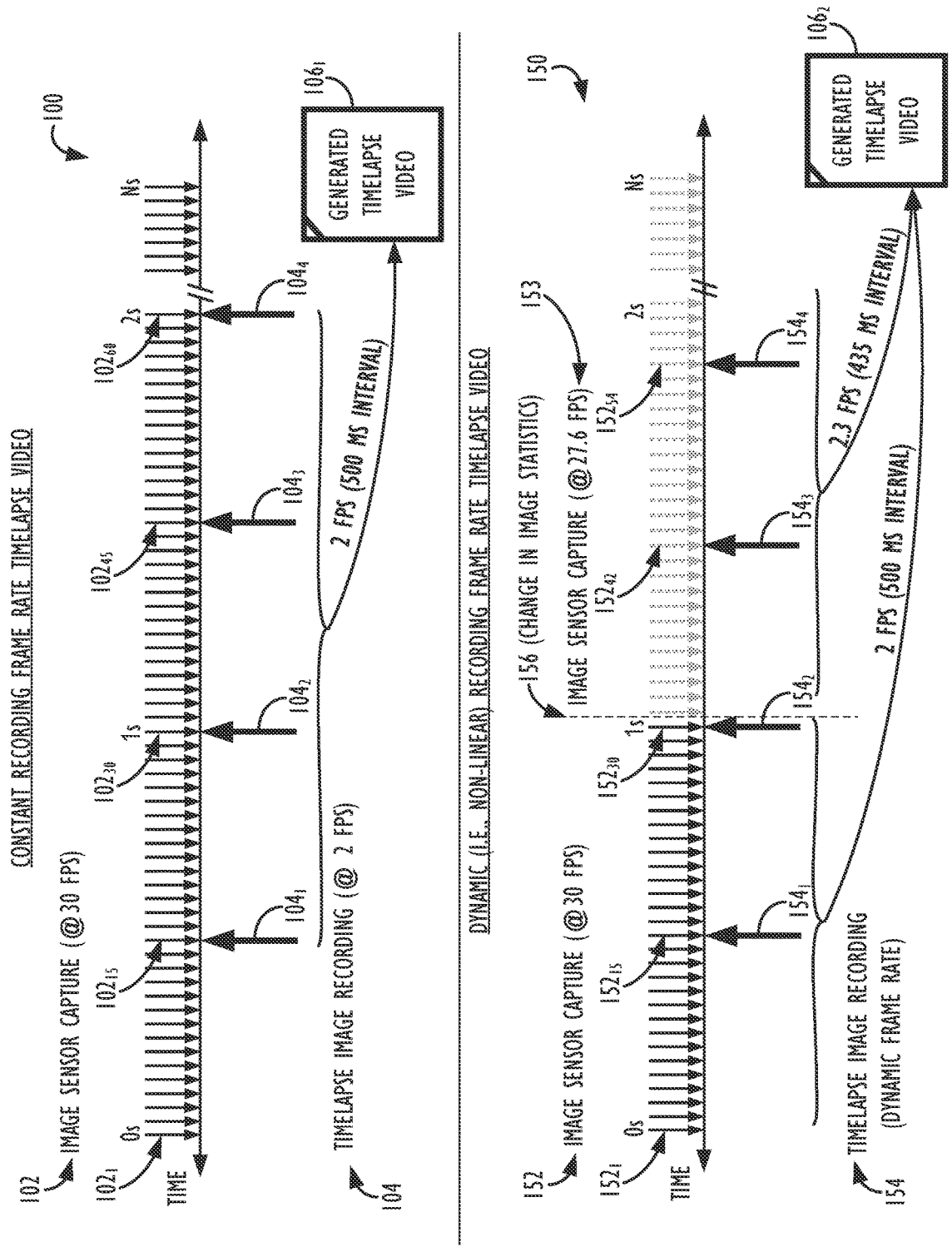
FIG. 1 illustrates examples of a constant recording frame rate timelapse video timeline and a dynamic recording frame rate timelapse video timeline, according to various embodiments.

Turning now to FIG. 1, examples of a constant recording frame rate timelapse video timeline (100) and a dynamic recording frame rate timelapse video timeline (150) are shown, according to various embodiments. Looking first at constant recording frame rate timelapse video timeline 100, an image sensor is capturing images at an exemplary image sensor capture rate 102 (e.g., 30 frames per second, or "fps"). Looking at timeline 100, the first image captured by the image sensor is labeled $102_1$, while the fifteenth image captured by the image sensor is labeled $102_{15}$, the thirtieth image captured by the image sensor (located at 1 s along the timeline) is labeled $102_{30}$, and so forth. In FIG. 1, an exemplary two second portion of timeline is shown, for illustrative purposes, though it is to be understood that the timeline may continue for up to "n" seconds, i.e., for as long as a user has indicated a desire to continue capturing the time lapse video.

Distinct from the rate at which images are "captured" by an image sensor, the techniques herein define a so-called image "recording" frame rate, which reflects the rate at which captured images are stored to a memory, e.g., to be used in an eventual generated timelapse video (e.g., timelapse video $106_1$, in the example of timeline 100). In the example of timeline 100, the timelapse image recording frame rate is shown as being 2 fps, that is, two frames being recorded to memory per second (i.e., an image being recorded to memory every 500 ms). The recording frame rate is illustrated along timeline 100 by the large arrows pointing to the first image recorded to memory ($104_1$) being the fifteenth image captured ($102_{15}$), followed by the second image recorded to memory ($104_2$) being the thirtieth image captured ($102_{30}$), followed by the third image recorded to memory ($104_3$) being the forty-fifth image captured ($102_{45}$), and so forth. As illustrated, this results in a timelapse video $106_1$ being generated with an image recording rate of 2 fps (though it is to be understood that the actual playback of timelapse video $106_1$ at display time could be sped up or slowed down as desired, e.g., played back at 15 fps, 30 fps, 60 fps, etc.).

As alluded to above, depending on the movement and rotation of the image capture device during the capture of the incoming image stream, this constant 2 fps image recording frame rate may be too high, e.g., for when there are long stretches of video with little to no movement or change in scene content and, likewise, the 2 fps image recording frame rate may be too low, e.g., for when the image capture device is moving rapidly and/or there is a large amount of change in scene content during the capture of the incoming image stream. Thus, it would be desirable to be able to intelligently and dynamically change the image recording frame rate, i.e., in a so-called "non-linear" fashion.

Turning now to dynamic recording frame rate timelapse video timeline 150, an image sensor is again capturing images at an exemplary image sensor capture rate 152 (e.g., 30 fps). Looking at timeline 150, the first image captured by the image sensor is labeled $152_1$, while the fifteenth image captured by the image sensor is labeled $152_{15}$, and so forth. By contrast with constant recording frame rate timelapse video timeline 100, in dynamic recording frame rate timelapse video timeline 150, the rate at which captured image frames are actually recorded or stored to memory for usage in the generated timelapse video $106_2$ may change dynamically over the duration of the image stream capture. In other words, the timelapse image recording 154 made from the timeline 150 is non-linear, i.e., it has a dynamic image recording frame rate.

As may now be appreciated, in the example of timeline 150, the timelapse image recording frame rate is shown as beginning at 2 fps (i.e., a 500 ms interval between images during the recording of image frames $154_1$ and $154_2$ to memory), but, after the 1 s mark on the timeline 150, the timelapse image recording frame rate is shown as dynamically changing to 2.3 fps (i.e., a 435 ms interval between images during the recording of image frames $154_3$, $154_4$, and so forth to memory). In this example timeline 150, the dynamically determined updated image recording frame rate of 2.3 fps is achieved by adjusting the image sensor's capture rate from 30.0 fps to 27.6 fps and then recording every $12^{th}$ image frame (rather than every $15^{th}$ image frame) that is captured at the new image sensor capture rate of 27.6 fps (i.e., recording image $152_{42}$, $152_{54}$, and so forth). In other words, 27.6 (i.e., the new capture fps) divided by 12 (i.e., recording every $12^{th}$ image frame)=the desired 2.3 fps updated image recording frame rate. As illustrated, use of a dynamic or non-linear image recording frame rate results in a timelapse video $106_2$ being generated with a blended effective image recording rate that is between 2 fps and 2.3 fps. As will be explained herein, according to some embodiments, one or more pieces of information, referred to herein as "image statistics," that are received or determined for the image capture device (and/or the contents of the images being captured) during the capture of the video image stream may be an impetus for determining a change in image recording rate (e.g., from 2 fps to 2.3 fps, in the example of timeline 150). As illustrated in timeline 150, there is an observed change in one or more of the image capture device's image statistics (156) at approximately the 1 s mark on the timeline that is significant enough to have caused the device to increase its image recording frame rate from 2 fps to 2.3 fps. For example, an increased amount of change in a thumbnail luma image generated for an image captured by the image capture device around the 1 s mark (i.e., as compared to a statistical model representing the amount of change in the luma thumbnail(s) generated for one or more of the images previously recorded from the incoming image stream) may be reflective of substantial changes in the scene content, so recording more images during this portion of the captured video image stream may cause the generated timelapse video $106_2$ to be less jerky, choppy, and/or unpleasant during these moments of increased scene content changes in the captured scene.

Exemplary Multi-Temporal Scale Content Change Detectors

Figure 2:
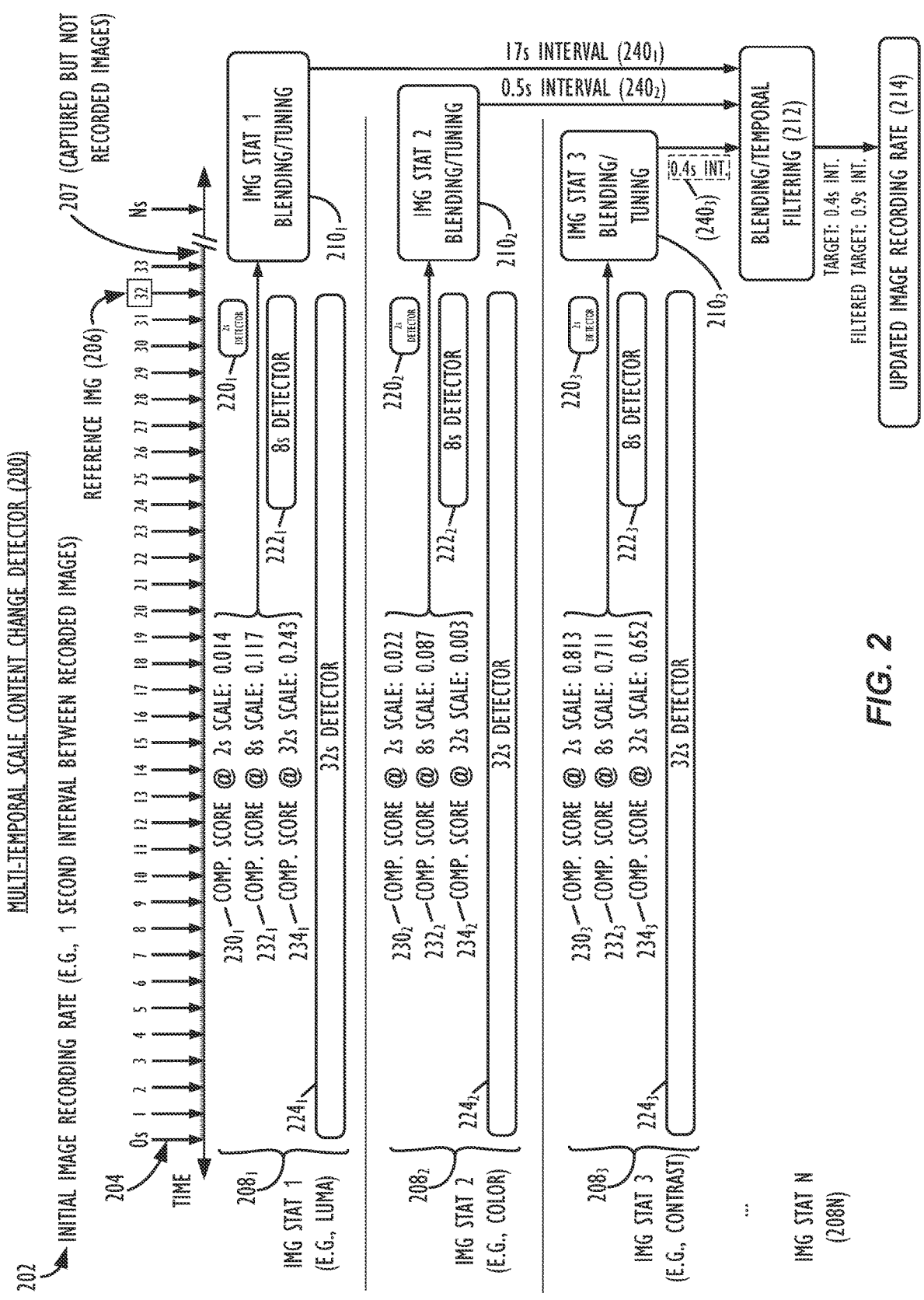
FIG. 2 illustrates an example of a multi-temporal scale content change detector, according to various embodiments.

Turning now to FIG. 2, an example of a multi-temporal scale content change detector (200) is illustrated, according to various embodiments. In the example of detector 200, there is an established exemplary initial image recording rate (202) of 1 fps, i.e., there is a one second interface between recorded images frames being saved into a timelapse video. This is illustrated by the large arrows (204) along the timeline, labeled as 0 s, 1 s, 2 s, 3 s, and so on, representing captured image frames that are recorded to memory, while the small tick marks (207) in between recorded image frames 204 being representative of the additional images captured (but not recorded) by an image sensor of an image capture device that is being used to generate the timelapse video (e.g., at a capture frame rate of 26 fps, or the like).

According to the embodiments disclosed herein, there may be various (e.g., two or more) image statistics 208 computed for each of the captured images. For instance, in the example of FIG. 2, the Image Statistic #1 ($208_1$) is an image luma-based image statistic (e.g., a 2D thumbnail luma image, Red, Green, and/or Blue thumbnail images, a histogram, array, or the like that may be computed for each captured image by the image senor), the Image Statistic #2 ($208_2$) is an image color-based image statistic (e.g., a 2D thumbnail color image, histogram, array, or the like that may be computed for each captured image by the image senor), and the Image Statistic #3 ($208_3$) is an contrast-based image statistic (e.g., a 2D contrast image, histogram, array, or the like that may be computed for each captured image by the image senor). It is to be understood that these types of image statistics are shown in FIG. 2 merely for exemplary purposes, and other image statistics (e.g., up to n different image statistics 208N) may be utilized in a given implementation, including statistics related to device rotation or movement during the capture of images (as opposed to the captured scene content).

Returning now to look at the specific example of Image Statistic #1 ($208_1$), a reference image may be defined for which the image statistics are currently being computed. In this example, the reference image will be reference image 206, which is located at t=32 s on the timeline. As may be appreciated, the scene content may not change an appreciable amount between any two consecutive captured image frames, thus, it may be preferable to compare changes in image statistics between the current reference image and the previously captured images frames over one or more different (e.g., longer) intervals, such as the preceding 2 s, 8 s, 32 s, etc., to get a more measurable and reliable metric of the amount of scene content change. Analyzing scene content changes using image statistics over multiple temporal scales may also allow the content change detector to select the correct image recording frame rate when the captured scene is only experiencing slow or gradual changes (e.g., a recording of the Sun on a cloudless day, or the like).

Thus, as will be explained in greater detail with regard to FIG. 3, according to some embodiments, multiple detectors using different time scales may be used to compute comparison scores for a given image statistic. For example, as shown in FIG. 2, Image Statistic #1 ($208_1$) utilizes: a 2 s detector ($220_1$); a 8 s detector ($222_1$); and a 32 s detector ($224_1$). The comparison scores computed by the various time scale detectors (e.g., $230_1$/$232_1$/$234_1$) may represent a metric reflecting the amount of change between statistics for the reference image and a statistical model based on two or more non-reference images from the captured image stream. For example, in the case of 2 s detector $220_1$, the comparison score $230_1$ may reflect a difference between a thumbnail luma image (or other statistical model) for reference image 206 and a statistical model representing the thumbnail luma images computed by the image sensor for a subset comprising the 2 s of image frames captured prior to reference image 206 (which may, e.g., comprise computing an average value or a variance of the luma values for the 60 previously-captured image frames, e.g., if the image sensor is capturing images at a rate of 30 fps). In other embodiments, the comparison may be made between the reference image 206 and a statistical model based on some other representative subset or sampling of the image frames captured in the corresponding time scale (e.g., every other image frame from the preceding 2 s of image frames captured prior to the reference image 206). In some implementations, the statistical model could also comprise an AI or ML-generated model representative of the captured scene content over a particular time scale of previously captured images. In the example of Image Statistic #1 ($208_1$), the comparison score at the two second time scale for image luma has an exemplary value of 0.014 ($230_1$), the comparison score at the eight second time scale for image luma has an exemplary value of 0.117 ($232_1$), and the comparison score at the thirty-two second time scale for image luma has an exemplary value of 0.243 ($234_1$).

In some embodiments, the results of the comparison scores of the various time scale detectors (e.g., $230_1$/$232_1$/$234_1$) may be blended together, according to desired tuning parameters, e.g., at Image Statistic #1 Blending/Tuning module $210_1$. In some embodiments, the various comparison scores may be averaged (e.g., a weighted average), while in still other embodiments, a minimum or maximum of the various comparison scores may be selected, etc., when determining the final blended value for Image Statistic #1 at $210_1$. As illustrated in FIG. 2, the exemplary analysis of the amount of change exhibited in Image Statistic #1 ($208_1$) (i.e., image luma) over various time scales corresponds to a target statistic image frame recording interval of 17 s ($240_1$), i.e., an image recording frame rate of 0.059 fps. In some embodiments, the comparison scores may be converted into target image frame recording intervals based on a desired target amount of motion or change per frame (or per time interval) in the final generated timelapse video, e.g., in terms of an average amount of pixel change between image frames, an average amount of pixel motion per second, an amount of color temperature change per second, an amount of color change per second, and so forth.

The other image statistics may be computed and treated similarly to the manner in which Image Statistic #1 ($208_1$) was described above. For example, Image Statistic #2 ($208_2$), i.e., an image color difference statistic, may be computed at the analogous 2 s ($220_2$), 8 s ($222_2$), and 32 s ($224_2$) time scales, producing comparison scores $230_2$, $232_2$, $234_2$, respectively, which may be blended at Image Statistic #2 Blending/Tuning module $210_2$. As illustrated in FIG. 2, the exemplary analysis of the amount of change exhibited in Image Statistic #2 ($208_2$) (i.e., image color) over various time scales corresponds to a target statistic image frame recording interval of 0.5 s ($240_2$), i.e., an image recording frame rate of 2 fps.

Similarly, Image Statistic #3 ($208_3$), i.e., an image contrast difference statistic, may be computed at the analogous 2 s ($220_3$), 8 s ($222_3$), and 32 s ($224_3$) time scales, producing comparison scores $230_3$, $232_3$, $234_3$, respectively, which may be blended at Image Statistic #3 Blending/Tuning module $210_3$. As illustrated in FIG. 2, the exemplary analysis of the amount of change exhibited in Image Statistic #3 ($208_3$) (i.e., image contrast) over various time scales corresponds to a target statistic image frame recording interval of 0.4 s ($240_3$), i.e., an image recording frame rate of 2.5 fps.

According to some embodiments, once each of the target statistic image frame recording intervals have been computed (e.g., $240_1$/$240_2$/$240_3$), they may themselves be further blended at blending/temporal filtering module 212. As described above, in some embodiments, the various target statistic image frame recording interval values may be averaged (e.g., a weighted average), while in still other embodiments, a minimum or maximum of the various comparison scores may be selected, etc., when determining the final blended value for the image frame recording interval at 212. In this example, a "minimum" scheme has been implemented at blending/temporal filtering module 212 and, thus, the target statistic image frame recording interval of 0.4 s ($240_3$), computed for Image Statistic #3 ($208_3$), is the controlling value, and the new target image frame recording interval will be set to 0.4 s (i.e., an image recording frame rate of 2.5 fps).

Because, as mentioned above, the current image recording frame rate in example 200 is at 1 fps, according to some embodiments, temporal filtering may be applied to the change in image recording rate from 1 fps up to 2.5 fps. For example, the image recording interval beginning with the next captured image frame (as shown at block 214) may initially be reduced from 1 s to 0.9 s (i.e., an image recording frame rate of 1.11 fps). Then after additional captured frames, the image recording interval may continue to be reduced, e.g., to 0.8 s, then 0.7 s, and so forth, until the desired image recording interval of 0.4 s (i.e., an image recording frame rate of 2.5 fps) is finally reached. It is to be understood that, if there is sufficient change in the scene content of the captured video images during the temporal filtering process, a new target image frame recording interval may be calculated by detector 200, and the blending/temporal filtering module 212 may begin to change the "trajectory" of the filtered image frame recording interval towards said new target value.

If instead, the evaluation of the various Image Statistic Blending/Tuning modules 210 do not indicate more than a threshold amount of content change over any of the sampled time scales, then the image frame recording interval may simply be kept at its current value, e.g., to avoid too many small adjustments in the image frame recording interval, and thus possibly inducing a judder effect in the generated timelapse video.

As may now be appreciated, one of the benefits of the non-linear timelapse features described herein is to be able to dynamically adapt the image frame recording interval to the actual level of content change in the captured scene. By utilizing a cascade of detectors at multiple time scales, each time scale may output its own metric indicating the estimated level of content change in the scene, and then the multi-time scale outputs may be blended to compute the desired image frame rate for recording. Temporally filtering the changes in image frame recording rates smooths the final generated timelapse video, while still providing for a good amount of change between recorded image frames, resulting in a final timelapse video that is interesting and keeps a good rhythm. In this way, the operations to keep the timelapse video paced well are done automatically, and do not require the user to manually edit the video footage after it has been recorded.

Figure 3:
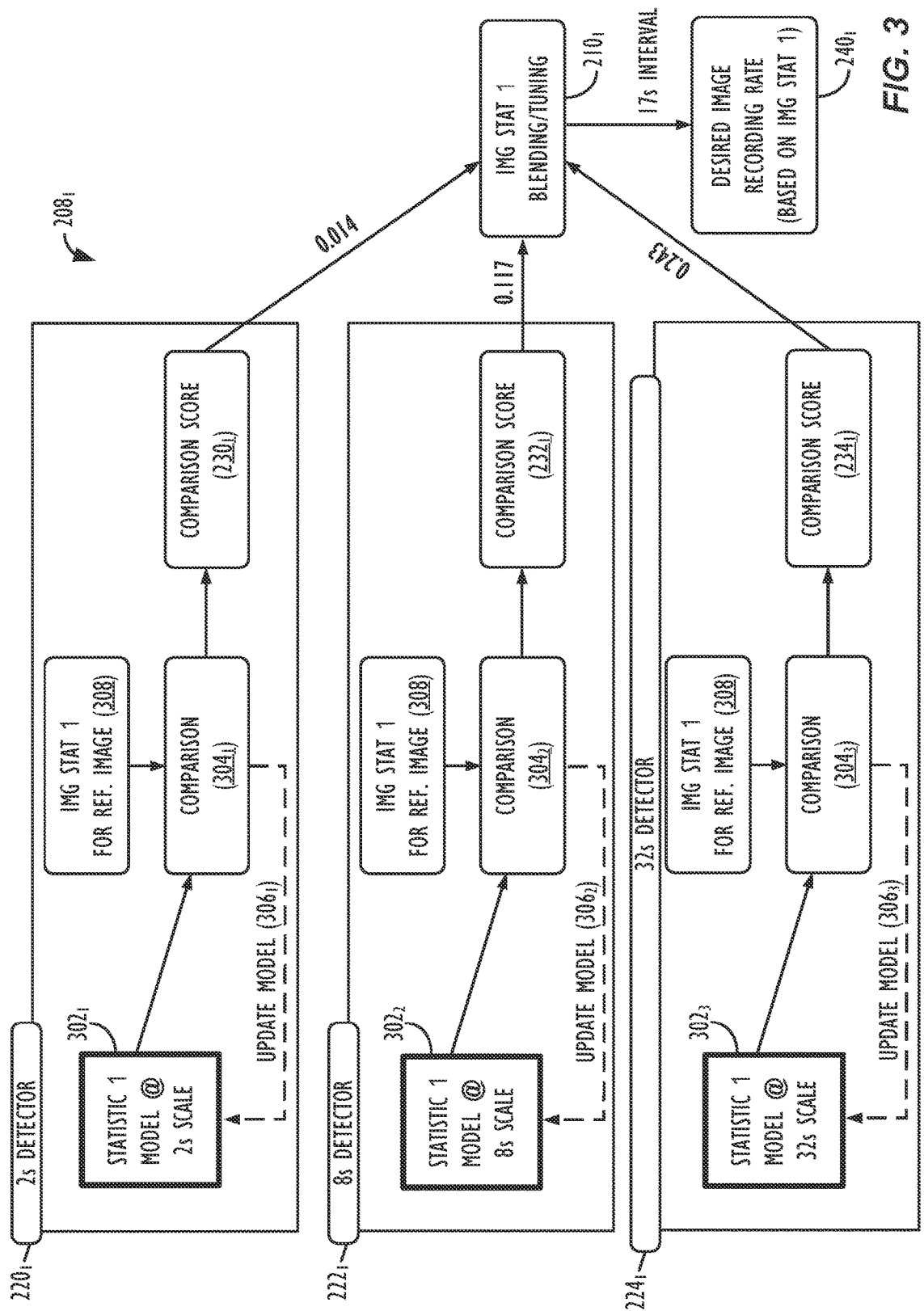
FIG. 3 illustrates additional details of a multi-temporal scale content change detector for an exemplary image statistic, according to various embodiments.

Turning now to FIG. 3, additional details (300) of a multi-temporal scale content change detector for an exemplary image statistic (e.g., luma) are shown, according to various embodiments. In comparison with example 200, example 300 presents further details for a particular multi-temporal scale content change detector $208_1$, originally introduced in FIG. 2. As described above with respect to FIG. 2, the multi-temporal scale content change detector for each image statistic that is being computed in a given implementation may have an associated mechanism that is used to compute the comparison score at the various time scale, depending on the nature of the particular image statistic. For example, for image luma thumbnails, an averaging operation of the respective image luma thumbnails may be the appropriate mechanism to make comparisons; whereas, in the case of motion vectors or semantic information, various sampling mechanisms (including computing difference images for full resolution or downscaled versions of captured images) may be employed to get an overall sense of the difference between the value of the particular image statistic for the reference image and the value of the particular image statistic for the time scale in question. In still other implementations, AI/ML representations for a particular image statistic may be created over various time scales and used in the comparison operations.

As shown in FIG. 3, at the 2 s detector $220_1$, the comparison score $230_1$ may be computed by taking a value of Image Statistic #1 for reference image 206 (labeled in FIG. 3 as 308) and then comparing it using the appropriate mechanism at comparison module $304_1$ with the statistical model of Image Statistic #1 at the 2 s time scale ($302_1$). As mentioned above with reference to FIG. 2, the computed value $230_1$ (in this case, 0.014) may then base passed to Image Statistic #1 Blending/Tuning module $210_1$. If desired, the statistical model $302_1$ may then be updated (labeled in FIG. 3 by dashed line arrow $306_1$) based on the newly captured image frame and/or the result of the comparison module at $304_1$ (or, alternately, the statistical model $302_1$ may be updated periodically, e.g., every n captured image frames).

Similarly, at the 8 s detector $222_1$, the comparison score $232_1$ may be computed by taking a value of Image Statistic #1 for reference image 206 (labeled in FIG. 3 as 308) and then comparing it using the appropriate mechanism at comparison module $304_2$ with the statistical model of Image Statistic #1 at the 8 s time scale ($302_2$). The computed value $232_1$ (in this case, 0.117) may then base passed to Image Statistic #1 Blending/Tuning module $210_1$. If desired, the statistical model $302_1$ may then be updated (labeled in FIG. 3 by dashed line arrow $306_2$) based on the newly captured image frame and/or the result of the comparison module at $304_2$ (or, alternately, the statistical model $302_2$ may be updated periodically, e.g., every n captured image frames). Finally, at the 32 s detector $224_1$, the comparison score $234_1$ may be computed by taking a value of Image Statistic #1 for reference image 206 (labeled in FIG. 3 as 308) and then comparing it using the appropriate mechanism at comparison module $304_3$ with the statistical model of Image Statistic #1 at the 32 s time scale ($302_3$). The computed value $234_1$ (in this case, 0.243) may then base passed to Image Statistic #1 Blending/Tuning module $210_1$. As mentioned above, if desired, the statistical model $302_3$ may then be updated (labeled in FIG. 3 by dashed line arrow $306_3$) based on the newly captured image frame and/or the result of the comparison module at $304_3$ (or, alternately, the statistical model $302_3$ may be updated periodically, e.g., every n captured image frames).

As described with reference to FIG. 2, the results of the comparison scores of the various time scale detectors for Image Statistic #1 (e.g., $230_1$/$232_1$/$234_1$) may be blended together, according to desired tuning parameters, e.g., at Image Statistic #1 Blending/Tuning module $210_1$, in this case, resulting in target Image Statistic #1 image frame recording interval of 17 s ($240_1$), i.e., an image recording frame rate of 0.059 fps. As also described with reference to FIG. 2, the target image frame recording interval computed for Image Statistic #1 may then be blended with the target image frame recording intervals computed for any other image statistics being computed for the incoming image stream (and, optionally, temporally filtered), in order to determine a final, smoothed updated image recording frame rate.

According to some embodiments, it may further be desirable to ensure that ensure that the updated image recording frame rate (as well as any temporally-filtering image recording rates used by the image capture device while it is moving towards the target of the updated image recording rate) are factors of the image sensor's image capture rate. For example, using the example above, if the image sensor is capturing images at a rate of 30 fps, then acceptable image recording rates may be all factors of 30, i.e.: 1 fps, 2 fps, 3 fps, 5 fps, 6 fps, 10 fps, 15 fps, or 30 fps (wherein a 30 fps recording rate means that the device is recording and keeping each image that is captured by the sensor, and 1 fps recording rate means that that the device is recording and keeping only every thirtieth image that is captured by the sensor, and so on). Conversely, if an updated image recording rate is determined to be a value such as 0.0946 fps, then the image sensor may be configured to capture images at any frame rate multiple of N*0.0946 fps, wherein N can be any integer value, subject to constraints of the required exposure times determined, e.g., by an auto-exposure system, and the capabilities of the image sensor. For example, if N=100, then the image sensor may be run at a capture frame rate of 9.46 fps, wherein only every $100^{th}$ captured image frame is recorded to memory, thereby achieving the desired updated image recording rate of 0.0946 fps.

Figure 4A:
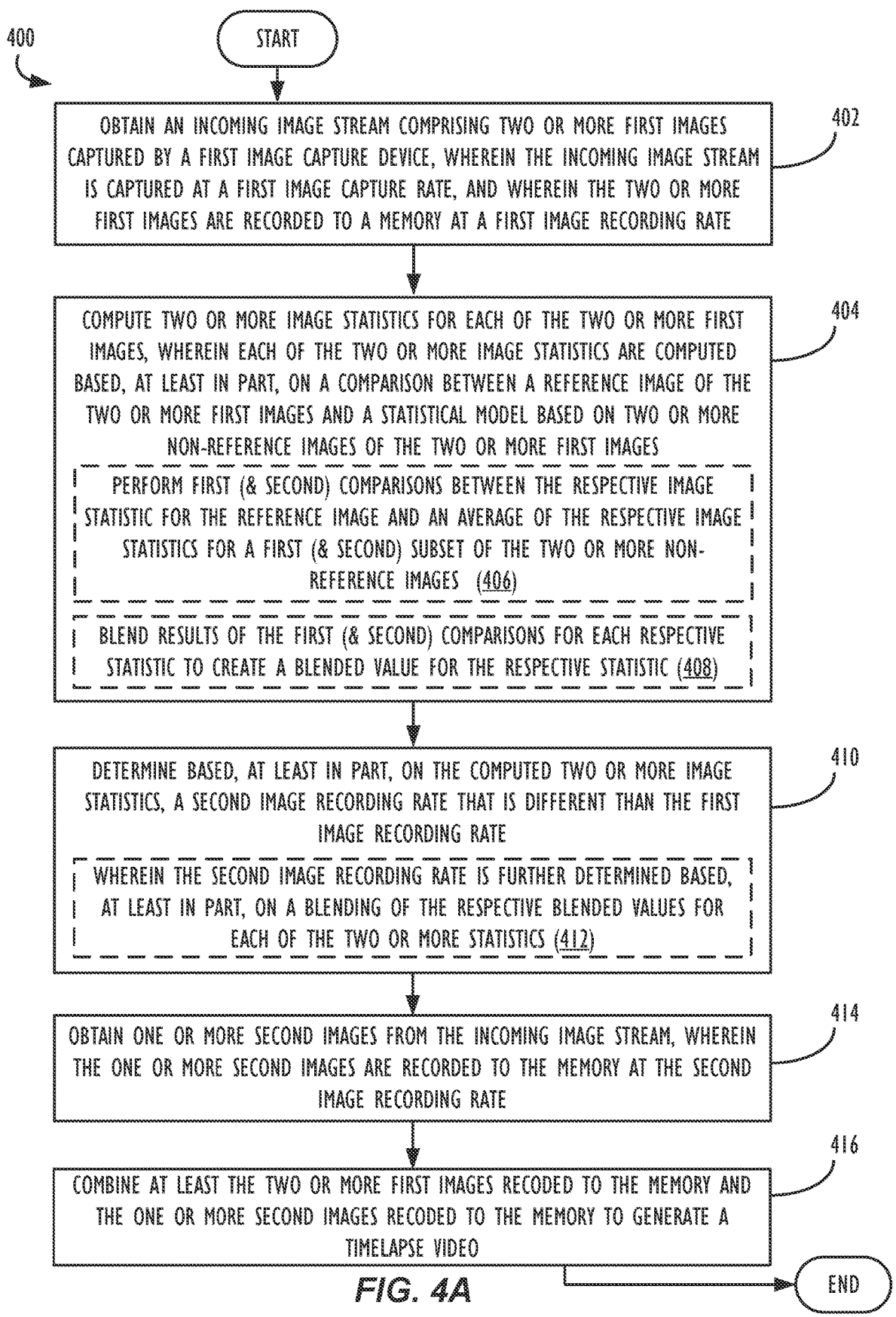
FIGS. 4A-4B are flow charts illustrating methods of performing non-linear timelapse video creation using multi-temporal scale content change detectors, according to various embodiments.
Figure 4B:
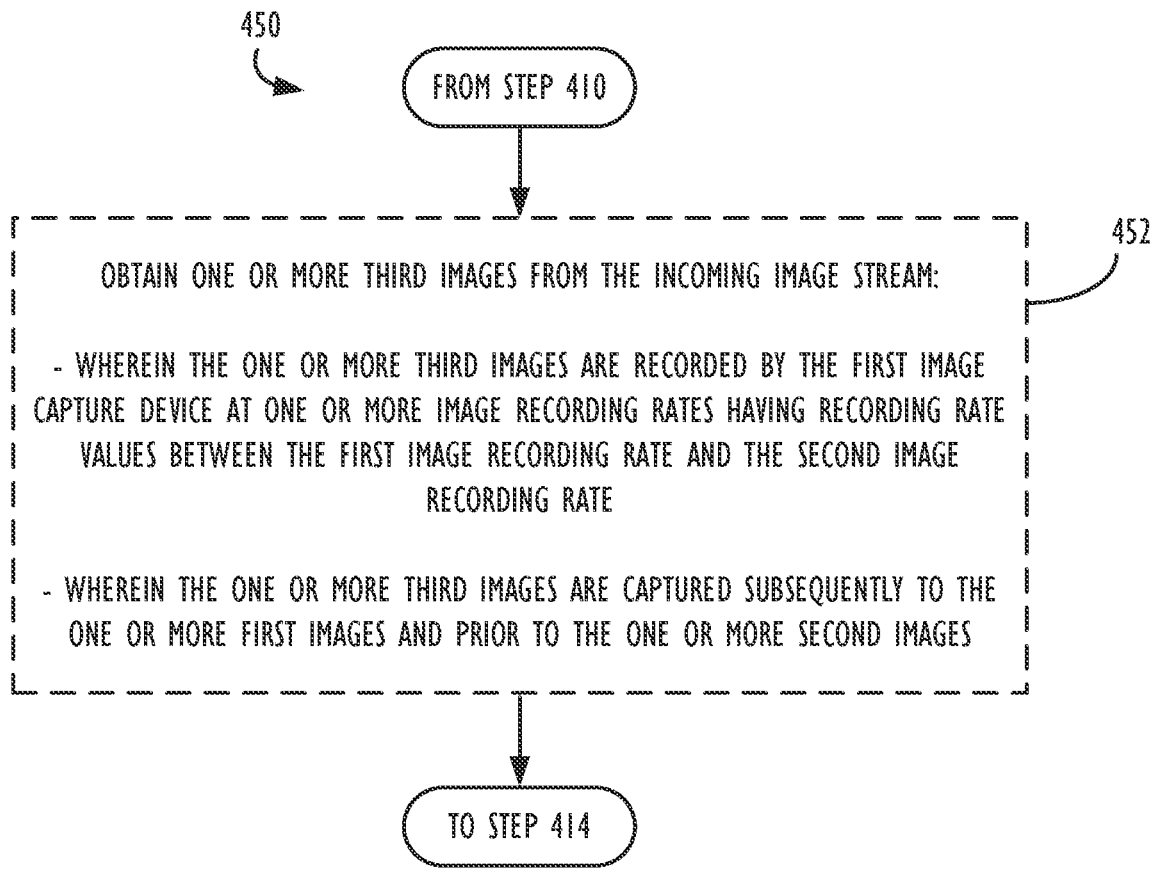

Exemplary Methods for Performing Rotation-Controlled Non-Linear Timelapse Video Creation FIGS. 4A-4B are flow charts illustrating methods of performing non-linear timelapse video creation using multi-temporal scale content change detectors, according to various embodiments.

Turning first to FIG. 4A, a method 400 is illustrated for performing non-linear timelapse video creation using multi-temporal scale content change detectors. First, at Step 402, the method 400 may obtain an incoming image stream comprising two or more first images captured by a first image capture device, wherein the incoming image stream is captured at a first image capture rate, and wherein the two or more first images are recorded to a memory at a first image recording rate.

Next, at Step 404, the method 400 may compute two or more image statistics for each of the two or more first images, wherein each of the two or more image statistics are computed based, at least in part, on a comparison between a reference image of the two or more first images and a statistical model based on two or more non-reference images of the two or more first images. In some embodiments, at Step 406, the method 400 may perform first (and, if multiple time scales are being evaluated, second) comparisons between the respective image statistic for the reference image and a a statistical model based on a first (and, if applicable, second) subset of the two or more non-reference images. At Step 408, the method 400 may then blend the results of the first (and, if applicable, second) comparisons for each respective statistic to create a blended value for the respective statistic.

Next, at Step 410, the method 400 may determine based, at least in part, on the computed two or more image statistics, a second image recording rate that is different than the first image recording rate. In some embodiments, the second image recording rate may further be determined based, at least in part, on a blending of the respective blended values for each of the two or more statistics (such as those described above with reference to Step 408).

Next, at Step 414, the method 400 may obtain one or more second images from the incoming image stream, wherein the one or more second images are recorded to the memory at the second image recording rate. Finally, at Step 416, the method 400 may combine at least the two or more first images recorded to the memory and the one or more second images recorded to the memory to generate a timelapse video.

Turning now to FIG. 4B, a method 450 is illustrated providing further details to the method 400 of performing temporal filtering in the production of non-linear timelapse videos that was described above with respect to FIG. 4A. First, at Step 452, the method 450 may continue operations from Step 410 of FIG. 4A by obtaining one or more third images from the incoming image stream. In some such embodiments employing temporal filtering operations, the one or more third images may be captured by the first image capture device at one or more image recording rates having recording rate values between the first image recording rate and the second image recording rate, wherein the one or more third images are captured subsequently to the one or more first images and prior to the one or more second images. The one or more third images recorded to memory may then be combined between the at least the two or more first images that were recorded to the memory and the one or more second images that were recorded to the memory in the generation of the final timelapse video.

Once the desired amount of temporal filtering has been applied, the method 450 may return operation to Step 414 of FIG. 4A, wherein the determined second image record rate has been reached by the image capture device. As may be understood, by temporally filtering the change of the image capture device's recording rate from the first image recording rate to the second image recording rate (i.e., by implementing the change in image recording rate over a span of tens or hundreds of captured image frames, rather than instantaneously), a smoother and more visually-pleasing final timelapse video may be produced.

It is to be understood that the steps above described in FIGS. 4A and 4B may be performed iteratively, e.g., in a loop, for as long as the video image stream is being captured, thus allowing the device to repeatedly evaluate image statistics associated with the captured images to further enhance the estimate of updated image recording rates to be used by the image capture device.

Exemplary Electronic Computing Devices

Figure 5:
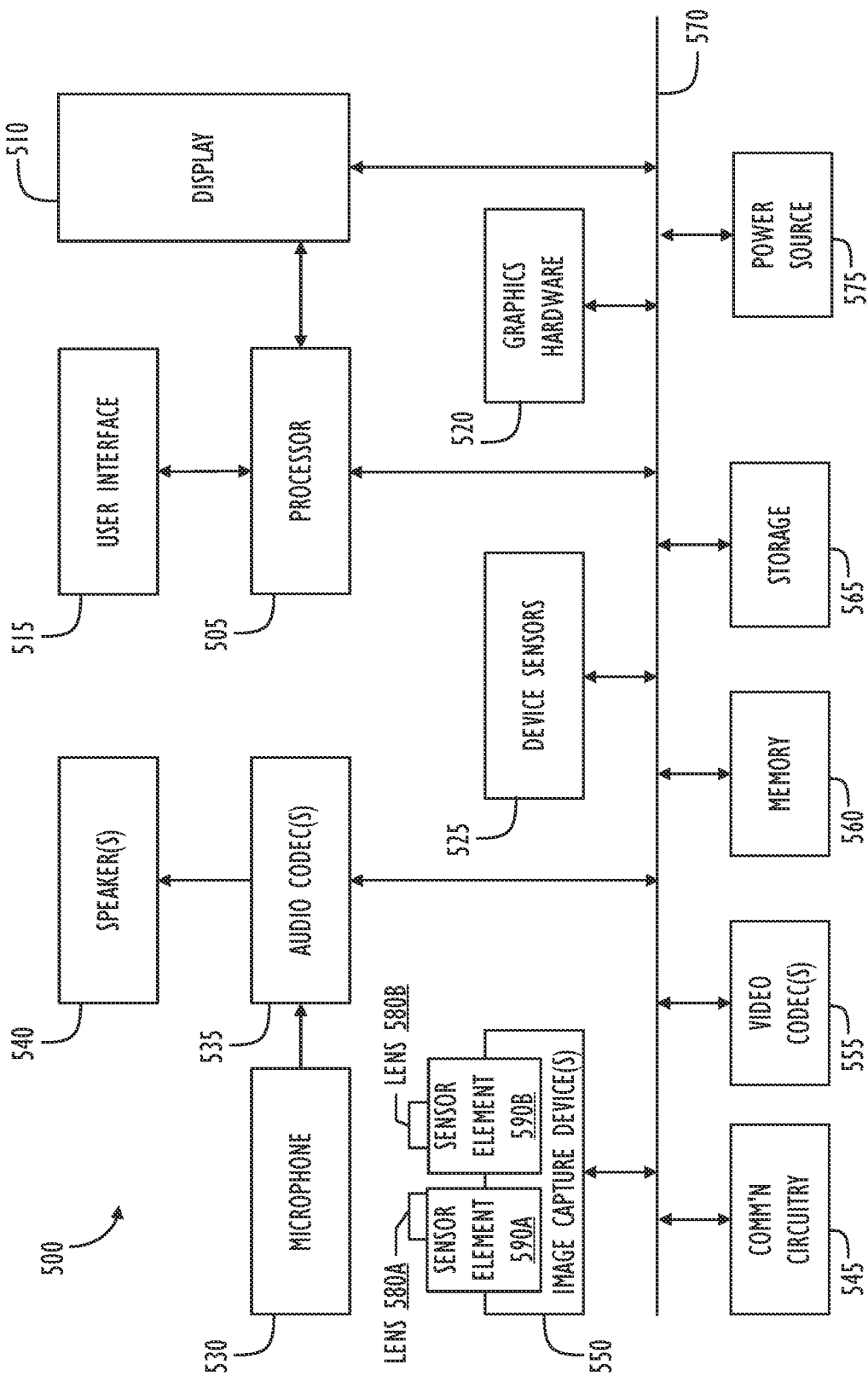
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensors/ambient light sensors/motion detectors/LiDAR sensors/depth sensors, accelerometers, inertial measurement units, gyroscopes, and/or other types of sensors), microphone 530, audio codec(s) 535, speaker(s) 540, communications circuitry 545, image capture device(s) 550, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the processing of images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device(s) 550 may comprise one or more camera units configured to capture images, e.g., images which may be processed to help further improve the efficiency of VIS operations, e.g., in accordance with this disclosure. Image capture device(s) 550 may include two (or more) lens assemblies 580A and 58013, where each lens assembly may have a separate focal length. For example, lens assembly 580A may have a shorter focal length relative to the focal length of lens assembly 58013. Each lens assembly may have a separate associated sensor element, e.g., sensor elements 590A/590B. Alternatively, two or more lens assemblies may share a common sensor element. Image capture device(s) 550 may capture still and/or video images. Output from image capture device(s) 550 may be processed, at least in part, by video codec(s) 555 and/or processor 505 and/or graphics hardware 520, and/or a dedicated image processing unit or image signal processor incorporated within image capture device(s) 550. Images so captured may be stored in memory 560 and/or storage 565.

Memory 560 may include one or more different types of media used by processor 505, graphics hardware 520, and image capture device(s) 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein. Power source 575 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 500.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
a memory;
one or more image capture devices; and
one or more processors operatively coupled to the memory, wherein the one or more processors are configured to execute instructions causing the one or more processors to:
obtain an incoming image stream comprising two or more first images captured by a first image capture device of the one or more image capture devices, wherein the incoming image stream is captured at a first image capture rate, and wherein the two or more first images are recorded to the memory at a first image recording rate;
compute two or more image statistics for each of the two or more first images, wherein each of the two or more image statistics are computed based, at least in part, on a comparison between a reference image of the two or more first images and a statistical model based on two or more non-reference images of the two or more first images;
determine based, at least in part, on the computed two or more image statistics, a second image recording rate that is different than the first image recording rate;
obtain one or more second images from the incoming image stream, wherein the one or more second images are recorded to the memory at the second image recording rate; and
combine at least the two or more first images recorded to the memory and the one or more second images recorded to the memory to generate a timelapse video.

2. The device of claim 1, further comprising:
one or more sensors,
wherein at least one of the two or more image statistics computed for each of the two or more first images is based, at least in part, on information obtained from the one or more sensors.

3. The device of claim 1, wherein the comparison between a reference image of the two or more first images and a statistical model based on two or more non-reference images of the two or more first images that is performed as a part of the computation of each of the two or more image statistics comprises:
performing a first comparison between the respective image statistic for the reference image and a representation of the respective image statistics for a first subset of the two or more non-reference images.

4. The device of claim 3, wherein the comparison between a reference image of the two or more first images and two or more non-reference images of the two or more first images that is performed as a part of the computation of each of the two or more image statistics further comprises:
performing a second comparison between the respective image statistic for the reference image and a representation of the respective image statistics for a second subset of the two or more non-reference images, wherein the first subset and the second subset correspond to images captured over different lengths of time.

5. The device of claim 4, wherein results of the first comparison and the results of the second comparison for each respective statistic are blended to create a blended value for the respective statistic.

6. The device of claim 5, wherein the second image recording rate is further determined based, at least in part, on a blending of the respective blended values for each of the two or more statistics.

7. The device of claim 1, wherein at least one of the two or more image statistics comprises: an image thumbnail; a color histogram; a local histogram; a set of motion vectors; a depth map; a set of contrast statistics; or semantic content information.

8. The device of claim 1, further comprising instructions causing the one or more processors to:
obtain one or more third images from the incoming image stream,
wherein the one or more third images are recorded to the memory by the first image capture device at one or more image recording rates having recording rate values between the first image recording rate and the second image recording rate,
wherein the one or more third images are captured subsequently to the one or more first images and prior to the one or more second images, and
wherein the instructions causing the one or more processors to generate a timelapse video further comprise instructions causing the one or more processors to combine the one or more third images recorded to the memory with the two or more first images recorded to the memory and the one or more second images recorded to the memory.

9. The device of claim 1, wherein the second image recording rate is a factor of an image capture rate of the first image capture device, or wherein the image capture rate of the first image capture device is set to be a multiple of the second image recording rate.

10. The device of claim 1, wherein the second image recording rate is further determined based, at least in part, on a desired amount of change per successive image in the generated timelapse video.

11. A non-transitory program storage device comprising instructions stored thereon to cause one or more processors to:
obtain an incoming image stream comprising two or more first images captured by a first image capture device, wherein the incoming image stream is captured at a first image capture rate, and wherein the two or more first images are recorded to a memory at a first image recording rate;
compute two or more image statistics for each of the two or more first images, wherein each of the two or more image statistics are computed based, at least in part, on a comparison between a reference image of the two or more first images and a statistical model based on two or more non-reference images of the two or more first images;
determine based, at least in part, on the computed two or more image statistics, a second image recording rate that is different than the first image recording rate;
obtain one or more second images from the incoming image stream, wherein the one or more second images are recorded to the memory at the second image recording rate; and
combine at least the two or more first images recorded to the memory and the one or more second images recorded to the memory to generate a timelapse video.

12. The non-transitory program storage device of claim 11, wherein the comparison between a reference image of the two or more first images and two or more non-reference images of the two or more first images that is performed as a part of the computation of each of the two or more image statistics comprises:
performing a first comparison between the respective image statistic for the reference image and a representation of the respective image statistics for a first subset of the two or more non-reference images.

13. The non-transitory program storage device of claim 12, wherein the comparison between a reference image of the two or more first images and two or more non-reference images of the two or more first images that is performed as a part of the computation of each of the two or more image statistics further comprises:
performing a second comparison between the respective image statistic for the reference image and a representation of the respective image statistics for a second subset of the two or more non-reference images, wherein the first subset and the second subset correspond to images captured over different lengths of time.

14. The non-transitory program storage device of claim 13, wherein results of the first comparison and the results of the second comparison for each respective statistic are blended to create a blended value for the respective statistic.

15. The non-transitory program storage device of claim 14, wherein the second image recording rate is further determined based, at least in part, on a blending of the respective blended values for each of the two or more statistics.

16. An image processing method, comprising:
obtaining an incoming image stream comprising two or more first images captured by a first image capture device, wherein the incoming image stream is captured at a first image capture rate, and wherein the two or more first images are recorded to a memory at a first image recording rate;
computing two or more image statistics for each of the two or more first images, wherein each of the two or more image statistics are computed based, at least in part, on a comparison between a reference image of the two or more first images and a statistical model based on two or more non-reference images of the two or more first images;
determining based, at least in part, on the computed two or more image statistics, a second image recording rate that is different than the first image recording rate;
obtaining one or more second images from the incoming image stream, wherein the one or more second images are recorded to the memory at the second image recording rate; and
combining at least the two or more first images recorded to the memory and the one or more second images recorded to the memory to generate a timelapse video.

17. The method of claim 16, wherein at least one of the two or more image statistics comprises: an image thumbnail; a color histogram; a local histogram; a set of motion vectors; a depth map; a set of contrast statistics; or semantic content information.

18. The method of claim 16, further comprising:
obtaining one or more third images from the incoming image stream,
wherein the one or more third images are recorded to the memory by the first image capture device at one or more image recording rates having recording rate values between the first image recording rate and the second image recording rate,
wherein the one or more third images are captured subsequently to the one or more first images and prior to the one or more second images, and
wherein generating the timelapse video further comprises combining the one or more third images recorded to the memory with the two or more first images recorded to the memory and the one or more second images recorded to the memory.

19. The method of claim 16, wherein the second image recording rate is a factor of an image capture rate of the first image capture device, or wherein the image capture rate of the first image capture device is set to be a multiple of the second image recording rate.

20. The method of claim 16, wherein the second image recording rate is further determined based, at least in part, on a desired amount of change per successive image in the generated timelapse video.

\* \* \* \* \*